United States Patent Office 2,797,304
Patented June 25, 1957

2,797,304

METHODS OF WELDING

James Arthur Donelan, West Harrow, England, assignor to The General Electric Company Limited, London, England No Drawing. Application November 3, 1954,
Serial No. 466,660

Claims priority, application Great Britain
November 6, 1953

1 Claim. (Cl. 219—118)

The present invention relates to methods of welding and more particularly to methods of seam welding. A method in accordance with the present invention is especially suitable for use for welding aluminium and aluminium alloys, though it can also be applied to the welding of other metals, such for instance as stainless steel, copper and copper alloys.

In the welding of metals such as aluminium, difficulty has been experienced in obtaining a sufficiently clean metal surface to enable a uniform weld to be obtained free from porosity and inclusions. In order to remove an oxide film from the surface of the metal continuous scratch brushing has been employed to expose bare metal, but it has been found that in certain circumstances excessive roughening of the surface may occur as a result of the scratch brushing. Also if the material to be welded has to be subjected to forming operations before the welding operation, there is a danger that some contamination of the surfaces to be welded or of parts adjacent to the parts to be welded may occur during the forming operation. If such contamination is present there is a tendency for porosity to occur in the weld or for inclusions to be observed in the weld.

One object of the present invention is the provision of a method of welding whereby the occurrence of porosity and inclusions in the weld metal is obviated, or at least mitigated, and this object is achieved by subjecting at least a part of the metal which is melted during welding to a re-melting operation after it has solidified following welding. Thus, according to the present invention, a method of welding in which a metal is welded is characterised by a subsequent re-melting of at least a part of the metal which is melted during the welding operation.

It has been found that it is desirable that the re-melted zone should extend over the full width of the metal which is melted during welding, but it is not essential that in all cases the whole of the metal which is melted during welding should be re-melted during the subsequent operation. On the other hand, if desired, the re-melting may be arranged to extend over a larger zone than the melting during welding.

The method in accordance with the present invention may be applied, for instance, to the manufacture of an aluminium tube or cable sheath by electric arc welding. The tube or cable sheath may be made from strip stock by forming it in any suitable manner to bring the edges into juxtaposition preparatory to welding. If an electric cable is to be made, the core of the cable may be inserted during the forming operation or after the welding operation, if preferred. During or before the forming operation the external surface of the tube adjacent to the edges to be welded is subjected to a scratch brushing operation to remove oxide and to expose clean metal. The welding operation may be performed using a gas-shielded electric arc and non-consuming electrodes, for example of tungsten or of a material consisting mainly of tungsten. The welding operation may be arranged to cause fusion of the two edges to be welded and may be performed without the addition of further metal, though if preferred a filler rod may be used. Alternatively, consumable electrodes may be used. The forming and welding operations may be performed generally as disclosed in the complete specification and drawings of our copending British patent application No. 4,111/52, the metal to be welded being arranged to move progressively past a stationary welding torch having two electrodes connected to the two phases of a two-phase alternating current supply while the common or neutral connection of the welding supply is connected to the work to be welded.

After the welding operation has been performed to weld together the edges of the material, a re-melting operation is performed without the addition of further metal so as to re-melt at least a part of the metal melted during welding. As above mentioned, it is desirable that the metal melted during the re-melting operation should extend over substantially the whole width of the metal melted during welding, though if desired the metal melted during the re-melting operation may extend beyond that melted during the welding operation. It is not essential that the metal which is melted during the re-melting operation should extend through the full thickness of the material to be melted: the metal melted during the re-melting operation may consist of a surface layer extending over the full width of the weld, or alternatively, it may extend through the whole or substantially the whole thickness of the material. In some cases, the depth of penetration of welding on re-melting may be greater than that in the main welding operation. The re-melting operation can conveniently be performed by subjecting the metal where it has been welded to the action of a further electric arc or arcs which can conveniently be gas-shielded arcs using non-consuming electrodes, the arrangement of the welding torch being similar to that used for the welding operation. If desired, however, a direct current arc or a single phase arc or other convenient means such for instance as a gas flame can be used for the re-melting operation. If desired a flux may be used during the re-melting operation.

In cases where the re-melting operation affects a zone of smaller depth and smaller width than the original welding operation, one advantage of the method according to the invention is that the strength at the weld is improved. This will be understood from the following explanation. When the liquid melt solidifies after the original welding operation, crystals grow from the solid material at each side of the weld leading to a preponderance of impurities at the central plane of the weld, the advancing crystal points pushing the impurities forward towards this plane in known manner. Upon re-melting the central zone, the crystal structure of this zone is destroyed by fusion and on re-melting, crystals grow from a roughly semi-circular boundary towards the outside surface of the weld and the impurities are now pushed ahead of the new crystals towards the outside surface so changing the nature of the joint at the central plane and giving an improved strength at the joint.

Another advantage of any method of welding in accordance with the invention is that due to the general heating up of the metal adjacent the weld, the rate of cooling after re-melting is slower than it is after the original welding operation and there is a longer time available for the evolution of gas which might otherwise give rise to porosity at the weld.

I claim:

A method of welding aluminum or aluminum alloys and in which metal is welded at a seam in a butt joint comprising the steps of melting the metal at said seam using a gas-shielded electric arc and at least one non-consuming electrode to form a welded joint of a predetermined depth and predetermined width transverse to the length of said seam and, after said metal at said seam has cooled sufficiently to recrystallize, remelting the whole length of the welded seam without the addition of further metal to a smaller depth and across a smaller width than said predetermined depth and width, and then allowing said remelted seam to cool.

References Cited in the file of this patent

UNITED STATES PATENTS

| | | |
|---|---|---|
| 1,464,076 | Jones | Aug. 7, 1923 |
| 1,583,212 | Williams | May 4, 1926 |
| 1,688,360 | Steigerwald | Oct. 23, 1928 |
| 1,828,977 | Miller | Oct. 27, 1931 |
| 1,981,850 | Fisher | Nov. 27, 1934 |
| 2,405,542 | Wassell | Aug. 6, 1946 |
| 2,681,402 | Muller | June 15, 1954 |
| 2,697,769 | Carpenter | Dec. 21, 1954 |
| 2,697,772 | Kinghorn | Dec. 21, 1954 |